United States Patent [19]

Hewitt

[11] Patent Number: 5,108,266
[45] Date of Patent: Apr. 28, 1992

[54] CHECK VALVE WITH ASPIRATING FUNCTION

[75] Inventor: Wayne A. Hewitt, LaPorte, Ind.

[73] Assignee: Allied-Signal Inc., Morristown, N.J.

[21] Appl. No.: 708,258

[22] Filed: May 29, 1991

[51] Int. Cl.$^5$ ............................................. F04F 5/54
[52] U.S. Cl. ...................................... 417/87; 417/159
[58] Field of Search ........................... 417/76, 87, 159

[56] References Cited

U.S. PATENT DOCUMENTS

| | | | |
|---|---|---|---|
| 3,599,657 | 8/1971 | Maldavs | 137/102 |
| 3,754,841 | 8/1973 | Grabb | 417/189 |
| 4,380,418 | 4/1983 | Crawford | 417/87 |

*Primary Examiner*—Robert G. Nilson
*Attorney, Agent, or Firm*—Leo H. McCormick, Jr.; Ken C. Decker

[57] ABSTRACT

This invention relates to a check valve having a first port connected to a chamber, a second port connected to a source of vacuum having a first fluid pressure and a third port connected to a second fluid pressure. A wall which separates the second port from the third has a plurality of openings therein which allows communication from the first port to the second port. A poppet moves away from the plurality of openings to allow air to flow from the first port to the second port in response to the first fluid pressure. When the fluid pressure in the chamber substantially equals the first fluid pressure, a pressure differential between the first and second pressures moves the poppet toward the plurality of openings to allow the second fluid pressure to further evacuate air from the chamber.

7 Claims, 1 Drawing Sheet

CHECK VALVE WITH ASPIRATING FUNCTION

This invention relates to a check valve having an aspirating function to further lower the fluid pressure in a chamber after the evacuation of air therein by vacuum produced through the operation of an internal combustion engine.

During the operation of an internal combustion engine, vacuum is created by the pumping action of the pistons which draws air into the cylinders through the intake manifold. This resulting vacuum is created since air can not enter the cylinders fast enough to keep up with the rapidly descending pistons because the flow of air through the throat of the intake manifold is obstructed by the position of a throttle valve. The fluid pressure level of the vacuum is also dependent on the introduction of recirculated exhaust gases that are mixed with the air downstream of the throttle valve.

Many components, such as heaters, windshield wipers, lights switches, transmission and brake assist boosters in a vehicle are powered or controlled by a pressure differential created by vacuum produced at the intake manifold and atmospheric pressure. A goal of automobile manufactures is to reduce contaminants in the exhaust gases to meet clean air standards. Such a goal may have an adverse effect on the fluid pressure level of the vacuum produced and available to operate the components in a vehicle. The need to intensify the available vacuum is not a new problem and structure such as disclosed in U.S. Pat. No. 3,754,841 suggest a solution to maintain the fluid pressure level of vacuum at a desired level. This structure is quite adequate for the purpose intended, however the cost to manufacture this system has not been accepted by the automobile manufactures as of this date.

Most components or accumulators associated with the components have a check valve to maintain the fluid pressure level developed by vacuum in a chamber in anticipation of future operation. The body of such check valves are normally molded from a plastic material and after a poppet is located on a center projection, a cap is attached to the body to form a sealed structure.

While double poppet check valves as disclosed in U.S. Pat. No. 3,599,657 have been used to control communication between liquids and gases in a distribution system, in essence each poppet only controls a single fluid and does not function to change the fluid pressure of either the liquid or the gas. I have devised a double poppet check valve which controls the flow communication of air from a chamber to intensify the fluid pressure level in the chamber. In my check valve, a housing having a bore therein has a first port connected to the chamber, a second port connected to a conduit in communication with the intake manifold of the internal combustion engine and a third port through which air is aspirated from the chamber by air which continually moves past the third port. A passageway in the housing has a throat section in which the third port is located connected to an entrance port and an exit port. A first poppet is located in said bore over the first port by a wall located in the bore which separates the second port from the third port. The wall has a plurality of openings therein through which the first port is communicated with the second port. The wall has a first projection for positioning the first poppet over the first port to prevent communication from the bore back into the chamber. A second poppet is located in the bore over the plurality of openings in said wall by an end cap connected to the housing for sealing said bore to prevent communication from the second port to the third port. The fluid pressure of the vacuum developed during the operation of the internal combustion engine continually draws air through the passageway and from the chamber through the second port. When the fluid pressure level in the chamber is substantially equal to the fluid pressure level of the vacuum, the second poppet seats on the openings in the wall. Thereafter, the fluid pressure of the air flowing in the throat of the passage continues to aspire air from the chamber by way of the third port to further lower the fluid pressure in the chamber.

It is an object of this invention to provide a system with a check valve having an aspirator port through which air is further evacuated from a chamber after a fluid pressure level is obtained by the pressure level of a vacuum developed during the operation of an internal combustion engine.

It is a further object of this invention to provide a system with a check valve with allows fluid communication from a first port to a second and third port but prevents communication between the second and third ports.

A still further object of this invention is to provide a system with a check valve with a passageway connected to filter throughwhich air is continually flowing to the intake manifold of a internal combustion engine. The passageway being connected by a port through which air is further evacuated from a chamber after a fluid pressure level is obtained in the chamber by a vacuum developed during the operation of an internal combustion engine.

These and other objects and advantages should be apparent to those after reading this specification while viewing the drawings wherein.

Figure 1:
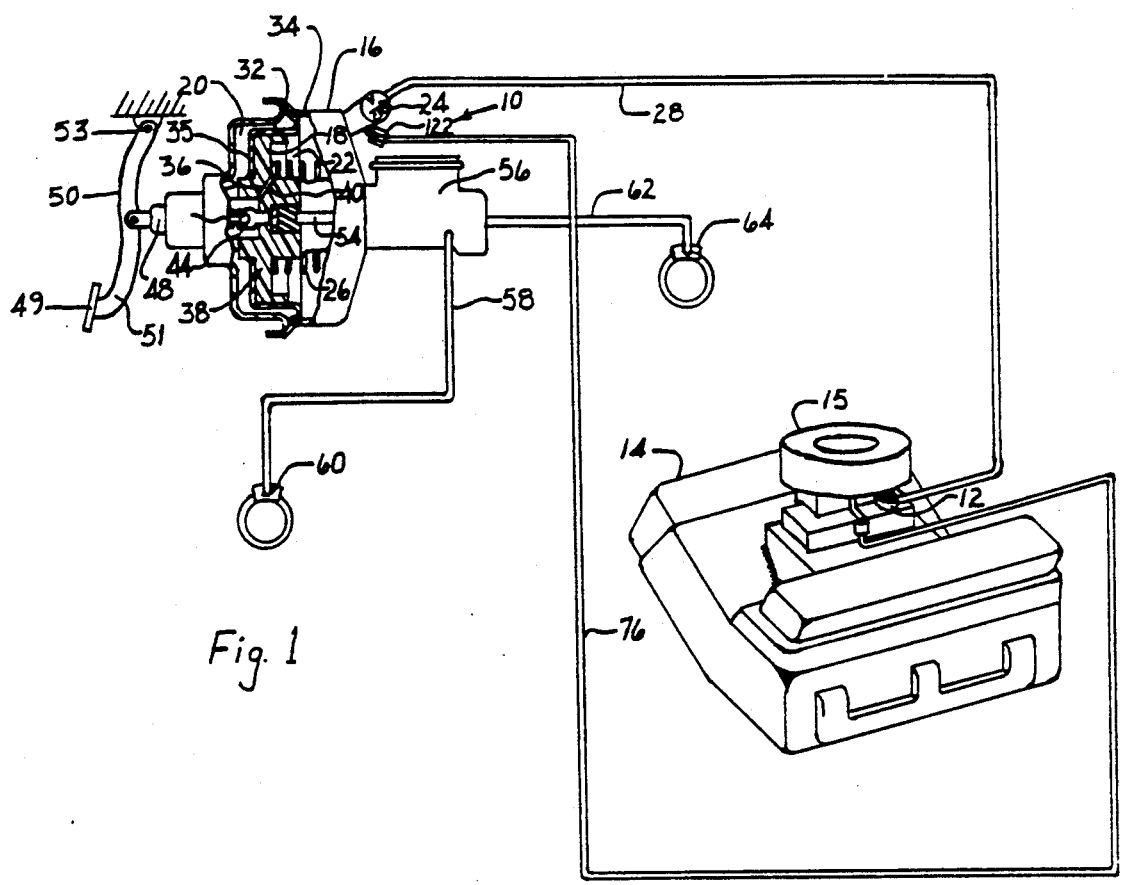
FIG. 1 is a schematic illustration of a brake system having a check valve made according to the principles of this invention incorporated therein to intensify the fluid pressure level of the vacuum received thereby during the operation of the internal combustion engine.

In the power braking system 10 shown in FIG. 1, during the operation of the internal combustion engine 14 vacuum develops at the intake manifold 12 of an internal combustion engine 14. This vacuum which is communicated to the many components in the vehicle including servomotor or brake booster 16 for providing an assist in the operation of a brake system has a fluid pressure less than atmospheric pressure.

The servomotor means 16 has housing 34 with a front chamber 18 separated from a rear chamber 20 by a moveable wall 22. The fluid pressure of the vacuum developed at the intake manifold 12 is communicated to front chamber 18 by conduit 28 to create a partial vacuum in the front 18 and rear 20 chambers which suspends movable wall 22. A check valve 24 which is fixed to housing 34 only permits flow of air from chamber 18, so that under normal conditions the movable wall 22 is positioned in the rest location a shown in FIG. 1 by resilient member 26.

The movable wall 22 has a diaphragm 32 with an outer diameter bead secured to the periphery of the housing 34 of the servomotor or brake booster 16 and an inner diameter bead which surrounds an opening 36 which snaps into a groove 35 on a hub 38. Hub 38 has a passage 40 which connects front chamber 18 with a control chamber 42. Valve means 44 located in the hub 38 controls the flow of air from the control chamber 42 through passage 46 into the rear chamber 20. A push rod 48 attached to the valve means 44 is connected to a pedal 51 of actuator means 50.

Upon application of a force to pad 49 of actuator means 50, pedal 51 pivots on pin 53 to move valve means 44 in the hub 38 until seal 52 closes passage 46 to interrupt communication of the partial vacuum communication from chamber 18 and thereafter opens passage 46 to atmospheric pressure. With atmospheric pressure in rear chamber 20 and a partial vacuum in the front chamber 18, a pressure differential is created across the wall 22. This pressure differential is converted into an output force which is transmitted through push rod 54 to pressurized fluid in master cylinder 56. The pressurized fluid from the master cylinder 56 is transmitted through supply conduit 58 to the front wheel brakes 60 (only one being shown) and by conduit 62 to the rear wheel brakes 64 (only one being shown) of the vehicle.

The output force supplied to the master cylinder 56 is directly dependent upon the difference in fluid pressure between atmospheric pressure and the partial vacuum produced at the intake manifold 12 in the vehicle and the actuation force applied to the actuator means 50 attached to the valve rod 48. To meet certain safety standards set by the Department of Transportation, the pressure differential cannot be less than a set amount for a given installation or vehicle. However, at times the available partial vacuum produced in the manifold 12 by certain high performance engines 14, and other engines equipped with emission controls, may not meet this desired fluid pressure level. To sustain the capability of developing a minimum desired output force, a means is incorporated in check valve 24 to enhance the vacuum fluid pressure level throughwhich a pressure differential is created to operate the servomotor or brake booster 16.

Figure 2:
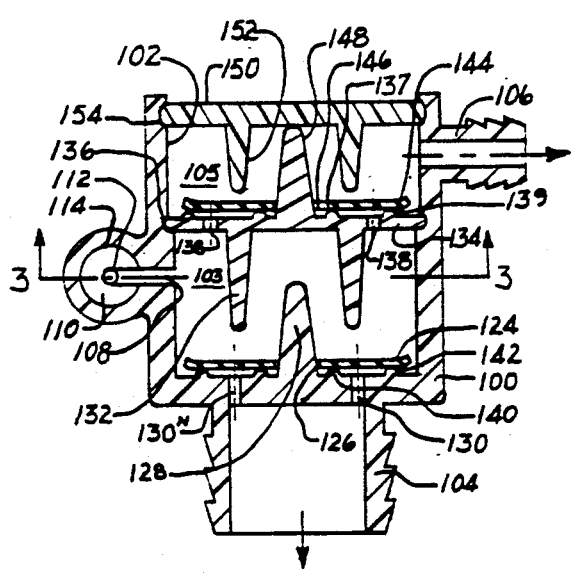
FIG. 2 is a sectional view of the check valve of Figure showing the relationship of the dual poppets therein with respect to the first, second and third ports through which air is evacuated from the vacuum brake booster.
Figure 3:
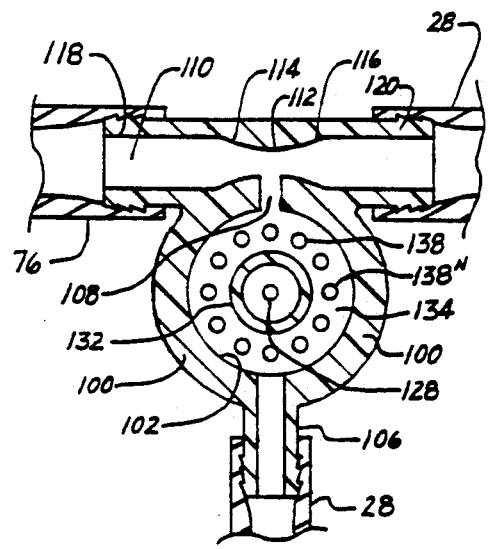
FIG. 3 is a sectional view of the check valve illustrating the aspirating passageway.

The check valve 24 as best shown in FIGS. 2 and 3 has a housing 100 having a bore 102 therein with a first port 104 connected to chamber 18 in housing 34, a second port 106 connected to conduit 28 in communication with the intake manifold 12 of the internal combustion engine 14 and a third port 108 through which air is aspirated from chamber 18 by air which continually moves past the third port 108 in passageway 110. Passageway 110 has a throat section 112 in which the third port 108 is located and tapered sections 114 and 116 which are connected to an entrance port 118 and an exit port 120, respectively. Flow through passageway 110 for a venturi flow member can be calculated such that the fluid pressure in the throat section 112 is about twenty percent lower than the fluid pressure at the entrance port 118 and exit port 120. Entrance port 118 is connected to the air filter housing 15 of the engine 14 by conduit 76 or alternately to a separate or additional filter 122 adjacent to housing 34 with a purpose of changing this filter with the regular maintenance of the vehicle. Exit port 120 which could be directly connected second port 106 is shown in the drawing as being connected to the intake manifold 12 by conduit 28.

A first poppet 124 is a rubber disc with an opening 126 which is located on projection 128 on housing 34. Projection 128 surrounds a plurality of openings 130, $130' \ldots 130^n$ in housing 34 in the first port 104. The first poppet 124 is retained on projection 128 by a projection 132 which extends from a wall 134 retained in groove 136 of housing 34. Wall 134 which separates the second port 106 from the third port 108 in bore 102 to form chamber 103 has a plurality of openings 138, $138' \ldots 138^n$ through which the first port 104 is communicated with the second port 106. Projection 132 which positions the first poppet 124 over openings 130, $130' \ldots 130^n$ to prevent communication from the bore 102 back into the chamber 18 may act as a guide for a spring (not shown) under some circumstances to urges poppet 124 toward annular seats 140 and 142.

A second poppet 144 has an opening 146 which is located on projection 148 that extends from wall 134. The second poppet 144 located on projection 148 by an annular projection 152 on end cap 150 is retained over the plurality of openings 138, $138' \ldots 138^n$. Under some circumstances, a spring (not shown) may be located on projection 152 to aid in seating poppet 144 on annular seats 137 and 139 on wall 134. End cap 150 snaps into groove 154 in housing 34 seals bore 102 and forms a chamber 105 adjacent the second port 106 to prevent atmospheric air from being communicated to conduit 28 connected to the intake manifold 12.

During the operation of the internal combustion engine 14 air is continually drawn through the passageway 110 by conduit 28 connected to the intake manifold 12. When a brake application is effected, atmospheric air is presented to chamber 20 to develop a pressure differential across wall 22 with the fluid pressure of the vacuum in chamber 18. After the control valve 44 returns to the rest position, atmospheric air from chamber 20 flows toward chamber 18 and is evacuated from chamber 18 by the vacuum developed at the intake manifold 12 by flowing through the first port 104, past poppet 124, openings 138, $138' \ldots 138^n$ in wall 134, and through the second port 106 to conduit 28. When the fluid pressure level in the chamber 18 is substantially equal to the fluid pressure level of the vacuum produced at the intake manifold 12, the second poppet 144 is seated on openings 138, $138' \ldots 138^n$ in the wall 134. Poppet 144 is seated as a result of a pressure differential created between the fluid pressure of vacuum present in chamber 105 and the fluid pressure developed by aspirating air through the third port 108 by flowing air through passageway 110. Thereafter, the fluid pressure of the air flowing in the throat 112 of the passageway 110 continues to aspire air from the chamber 18 by way of the third port 108 to further lower the fluid pressure until the fluid pressure equals the fluid pressure in the throat 112.

This enhancement of the fluid pressure or intensification of vacuum through the check valve 24 is applicable for operating a brake booster 10 or any other component in the vehicle.

We claim:

1. A check valve for use in a system wherein air is evacuated from a chamber by a first fluid pressure created by a vacuum developed during the operation of an internal combustion engine, said check valve comprising:

a housing having a bore therein with a first port connected to said chamber, an second port connected to a conduit in communication with the intake manifold of said internal combustion engine and a third port, said first fluid pressure continually moving air past said third port to create a second fluid pressure, said second fluid pressure being less than said first fluid pressure;

a first poppet located in said bore over said first port;

a wall located in said bore for separating said second port from said third port, said wall having a plurality of openings therein and a first projection for positioning said first poppet over said first port to prevent communication from said bore to said chamber;

a second poppet located in said bore adjacent said plurality of openings in said wall; and an end cap connected to said housing for sealing said bore, said end cap having a second projection for positioning said second poppet over said plurality of openings in said wall to prevent communication from said second port to said third port, said first pressure evacuating said chamber by flowing said air past said first and second poppets to said second port until the fluid pressure level in said chamber is substantially equal to said first pressure level when said second fluid pressure thereafter further evacuates said chamber by flowing air past the first poppet to said third port.

2. The check valve as recited in claim 1 wherein said housing further includes:
a passageway having a throat section connected to an entrance port and an exit port, said third port being located in said throat section.

3. The check valve as recited in claim 2 wherein said entrance port is connected to filtered air and said exit port is connected to the intake manifold of the internal combustion engine.

4. The check valve as recited in claim 3 wherein said first and second poppets are simultaneously opened to allow a large quantity of air to be evacuated from said chamber in a relative short time period by said first fluid pressure while said second poppet is seated on said wall when said second fluid pressure further evacuated said chamber.

5. The check valve as recited in claim 4 wherein said second fluid pressure is approximate twenty percent less than said first fluid pressure.

6. The check valve as recited in claim 2 further including:
a filter for removing contamination before air is presented to said entrance port.

7. The check valve as recited in claim 2 wherein said entrance port is connected to atmospheric air and said exit port is connected to said conduit in communication with the intake manifold.

* * * * *